United States Patent
Rajahram et al.

(10) Patent No.: US 10,778,687 B2
(45) Date of Patent: Sep. 15, 2020

(54) TRACKING AND WHITELISTING THIRD-PARTY DOMAINS

(71) Applicant: Dell Products L. P., Round Rock, TX (US)

(72) Inventors: Surendhar Rajahram, Pflugerville, TX (US); Prashanth Coimbatore Srinivasan, Round Rock, TX (US); Tanuj Arcot Omkar, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 15/884,552

(22) Filed: Jan. 31, 2018

(65) Prior Publication Data

US 2019/0238544 A1 Aug. 1, 2019

(51) Int. Cl.
*H04L 29/06* (2006.01)
*G06F 9/54* (2006.01)
*G06F 21/55* (2013.01)

(52) U.S. Cl.
CPC .......... *H04L 63/101* (2013.01); *G06F 9/547* (2013.01); *G06F 21/554* (2013.01); *H04L 63/0263* (2013.01); *H04L 63/1483* (2013.01); *H04L 63/20* (2013.01)

(58) Field of Classification Search
CPC .............. H04L 63/101; H04L 63/1483; H04L 63/0263; H04L 63/20; G06F 21/554; G06F 9/547
See application file for complete search history.

(56) References Cited

U.S. PATENT DOCUMENTS

| | | | |
|---|---|---|---|
| 9,830,453 B1* | 11/2017 | Feiertag | G06F 21/562 |
| 2016/0036816 A1* | 2/2016 | Srinivasan | H04L 61/1511 726/1 |
| 2016/0124839 A1* | 5/2016 | Mordo | G06F 11/3692 717/124 |
| 2016/0323309 A1* | 11/2016 | Sethi | H04L 63/101 |
| 2019/0238544 A1* | 8/2019 | Rajahram | H04L 63/1483 |

* cited by examiner

*Primary Examiner* — Farid Homayounmehr
*Assistant Examiner* — Sanchit K Sarker
(74) *Attorney, Agent, or Firm* — Campbell Stephenson LLP; Shiv S. Naimpally (57) ABSTRACT

Disclosed herein are methods, systems, and processes to track and whitelist third-party domains. A web request is received from a computing device. A Content Security Policy (CSP) header set is generated based on rule conditions and transmitted to the computing device. A violation notice indicating that third party domains used to render the web request violate one or more rule conditions identified by the CSP header set is received from the computing device. The third party domains are blocked as part of performing the web request.

20 Claims, 8 Drawing Sheets

TRACKING AND WHITELISTING THIRD-PARTY DOMAINS

FIELD OF THE DISCLOSURE

This disclosure is related to web security systems. In particular, this disclosure is related to tracking and whitelisting third-party domains.

DESCRIPTION OF THE RELATED ART

Phishing is an attempt to obtain sensitive information such as usernames, passwords, credit card data, and the like, for malicious reasons, by disguising as a trustworthy entity in electronic communication. Phishing is typically carried out using email spoofing, instant messaging, and the like, and directs unsuspecting users to enter personal information at a fake website that looks and feels like a legitimate website, the only difference being the Uniform Resource Locator (URL) of the website in question.

Tags are medium used to facilitate the collection and sharing of data between the website and various digital platforms that require this data (e.g. analytics platforms, advertising networks, and the like). The rapid growth of the web-based digital advertising has resulted in a significant number of advertising vendors, each having their own tag (or multiple tags) that are added to websites (e.g., to gather advertising data by monitoring user activities), and exposes such websites to security-related vulnerabilities.

A tag container permits addition of tags to a website without placing the tags directly on the website. Instead, a single container tag is used on the website and the tags are then attached and managed without the need for human intervention. Unfortunately, in modern web-based computing environments, phishing attacks and other security-based susceptibilities can also result from malicious software scripts injected by such third-party advertising containers that are loaded on a particular website.

SUMMARY OF THE DISCLOSURE

Disclosed herein are methods, systems, and processes to track and whitelist third-party domains. One such method involves receiving a web request from a computing device, generating a Content Security Policy (CSP) header set based on rule conditions, transmitting the CSP header set to the computing device, receiving a violation notice from the computing device indicating that one or more third party domains used to render the web request violate at least one rule condition identified by the CSP header set, and blocking the third party domains as part of performing the web request.

In one embodiment, the method involves accessing a whitelist lookup file, comparing the violation notice with the whitelist lookup file, and generating an alert notice based on the comparison if at least one third party domain is not part of the whitelist lookup file. In this example, the web request is received at a web server, and the rule conditions are set using a feature toggle system associated with the web server.

In certain embodiments, the method involves updating the whitelist lookup file by triggering an application programming interface (API) call to the feature toggle system and modifying the rule conditions in the feature toggle system. In this example, the rule conditions are retrieved by the feature toggle system.

In some embodiments, the method involves intercepting third party calls generated for the third party domains required to render the web request.

In other embodiments, the CSP header set includes one or more CSP report only headers and one or more CSP headers.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Content Security Policy (CSP) is a computer security standard introduced to prevent cross-site scripting (XSS), clickjacking, and other code (or script) injection attacks resulting from execution of malicious content in the trusted web page context. CSP is widely supported by modern web browsers and provides a standard method for website owners to declare approved origins of content that browsers should be allowed to load on that website. For example, covered types can include JavaScript, Cascading Style Sheets (CSS), Hypertext Markup Language (HTML)

frames, web workers, fonts, images, embeddable objects such as Java applets, ActiveX, audio and video files, HTML features, and the like.

In modern web-based computing environments, a tag can be a pixel image tag loaded onto a web page, a unique identification number identifying an affiliate web page, or could take the form of code that permits more advanced data collection. For example, tags can be incorporated into HTML/JavaScript code delivered from a web browser or an application when a web page loads. A given website may have hundreds or thousands of third-party tags that represent a wide range of data-drive application such as analytics services, digital marketing services, and the like. When a web browser loads a webpage, the tag tells the browser to connect to a third-party server. The third-party server recognizes the tag and executes the appropriate script associated with the tag.

As previously noted, a tag container permits addition of tags to a website without placing the tags directly on the website. Instead, a single container tag is used on the website and the tags are then attached and managed without the need for human intervention. Unfortunately, in modern web-based computing environments, phishing attacks and other security-related vulnerabilities can result from malicious scripts injected by such third-party advertising containers that are loaded on a particular website. It is desirable to monitor, identify, and block such problematic tags (e.g., malicious tags associated with non-whitelisted third-party domains) in near real-time. Disclosed herein are methods, systems, and processes to proactively track and expediently whitelist such third-party domains.

Example Third-Party Domain Tracking & Whitelisting Computing System

Figure 1:
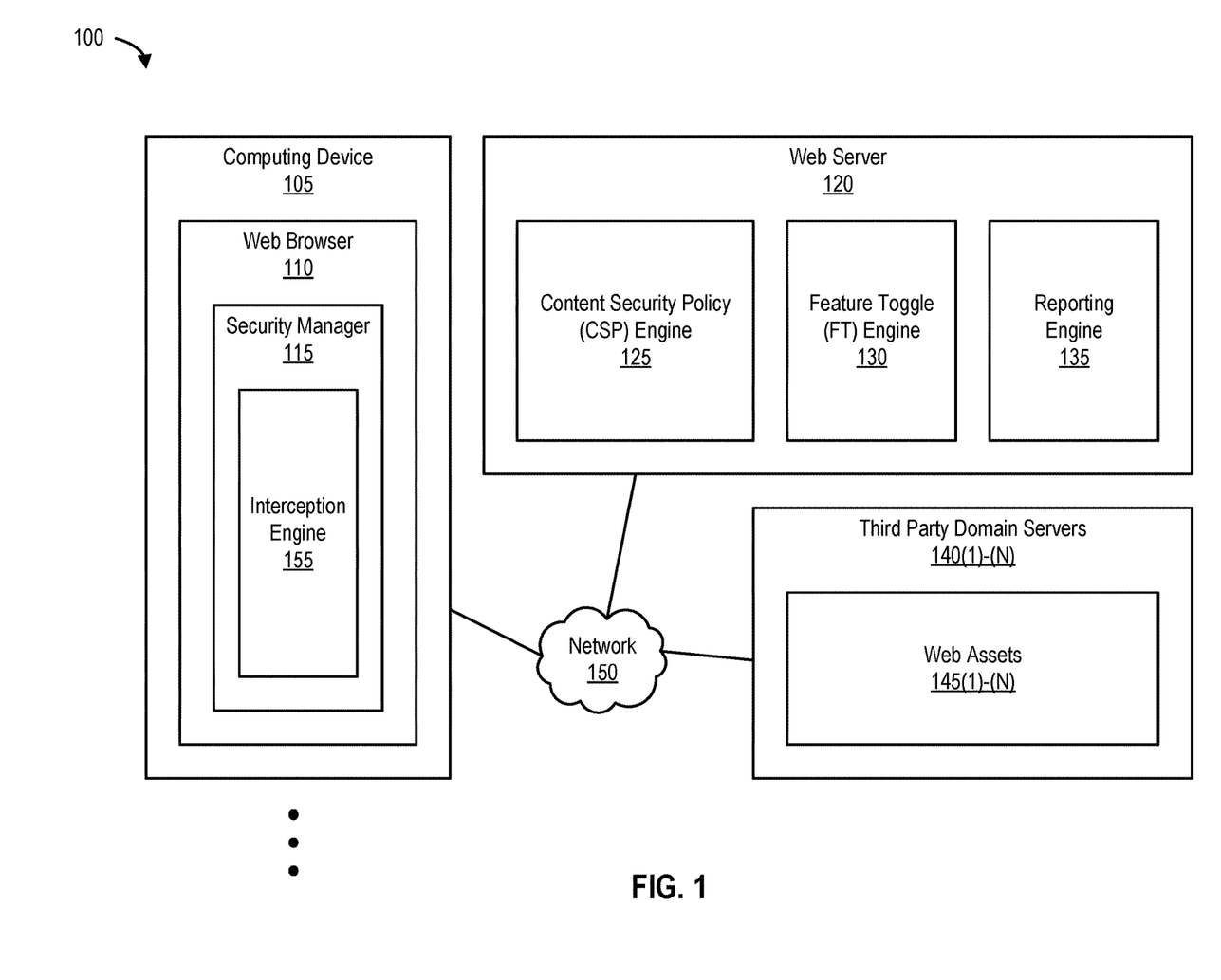
FIG. 1 is a block diagram 100 of a third-party domain tracking and whitelisting computing system, according to one embodiment of the present disclosure.

FIG. 1 is a block diagram 100 of a third-party domain tracking and whitelisting computing system, according to one embodiment. A computing device 105 implements a web browser 110. Web browser 110 includes a security manager 115 that manages security-related operations for computing device 105 using an interception engine 155 (e.g., checking Content Security Policy (CSP) headers returned from a server for violations, sending violation reports to a reporting Uniform Resource Locator (URL), among other operations). Web browser 110 also executes assets such as images, scripts, frames, and the like, to form a web page (e.g., web assets 145(1)-(N) from third-party domain servers 140(1)-(N) as shown in FIG. 1).

Computing device 105, third-party domain servers 140 (1)-(N), and a web server 120 are communicatively coupled to each other via network 150. Network 150 can be any type of network or interconnection (e.g., the Internet, a Wide Area Network (WAN), and the like), and computing device 105, third-party domain servers 140(1)-(N), and web server 120 can each be any type of computing device (e.g., a desktop, a laptop, a mobile computing device such as a tablet or a smartphone, a server, and the like).

Web server 120 includes at least a content security policy (CSP) engine 125, a feature toggle (FT) engine 130, and a reporting engine 135. CSP engine 125 generates one or more CSP headers (e.g., CSP report only headers as well as CSP headers), FT engine 130 manages CSP rules (e.g., one or more pre-determined rule conditions applicable to tags, tag containers, and/or domains), and reporting engine 135 implements at least a whitelist (e.g., in the form of a whitelist lookup file) and a reporting URL (e.g., to receive violation reports).

A whitelist or a whitelist lookup file is a list or register of entities (e.g., domain names, internet protocol (IP) addresses, URLs, container tags, and the like), that are provided a particular privilege, service, mobility, access, and/or recognition. For example, domain names and/or container tags listed and/or included in a whitelist (e.g., a whitelist lookup file maintained and updated by reporting engine 135) will be accepted, approved, and/or recognized when it comes to being provided web-based services.

In certain embodiments, the third-party domain tracking and whitelisting computing system of FIG. 1 provides and implements at least a two-phase process to proactively track and expediently block problematic tags in near real-time at two levels: (1) during violation policy creation and (2) blocking the violated calls. In some embodiments, and during the first phase, third-party calls (e.g., calls from one or more container tags to connect to third-party servers such as third-party domain servers 140(1)-(N) and execute assets such as web assets 145(1)-(N) third-party servers) generated from host properties (e.g., web server 120) are intercepted and fed to a reporting tool (e.g., reporting engine 135). The reporting tool then looks up a host authorized whitelist and generates alerts (e.g., to security teams) if there is a mismatch of domains in the whitelist. In other embodiments, and during the second phase, non-compliant domains are identified and are blocked by security manager 115 of web browser 110 by conforming to a violation policy. Therefore, the computing system of FIG. 1 provides and facilitates multi-level automation of blocking non-whitelisted domains in near real-time.

Example Domain Monitoring Manager

Figure 2:
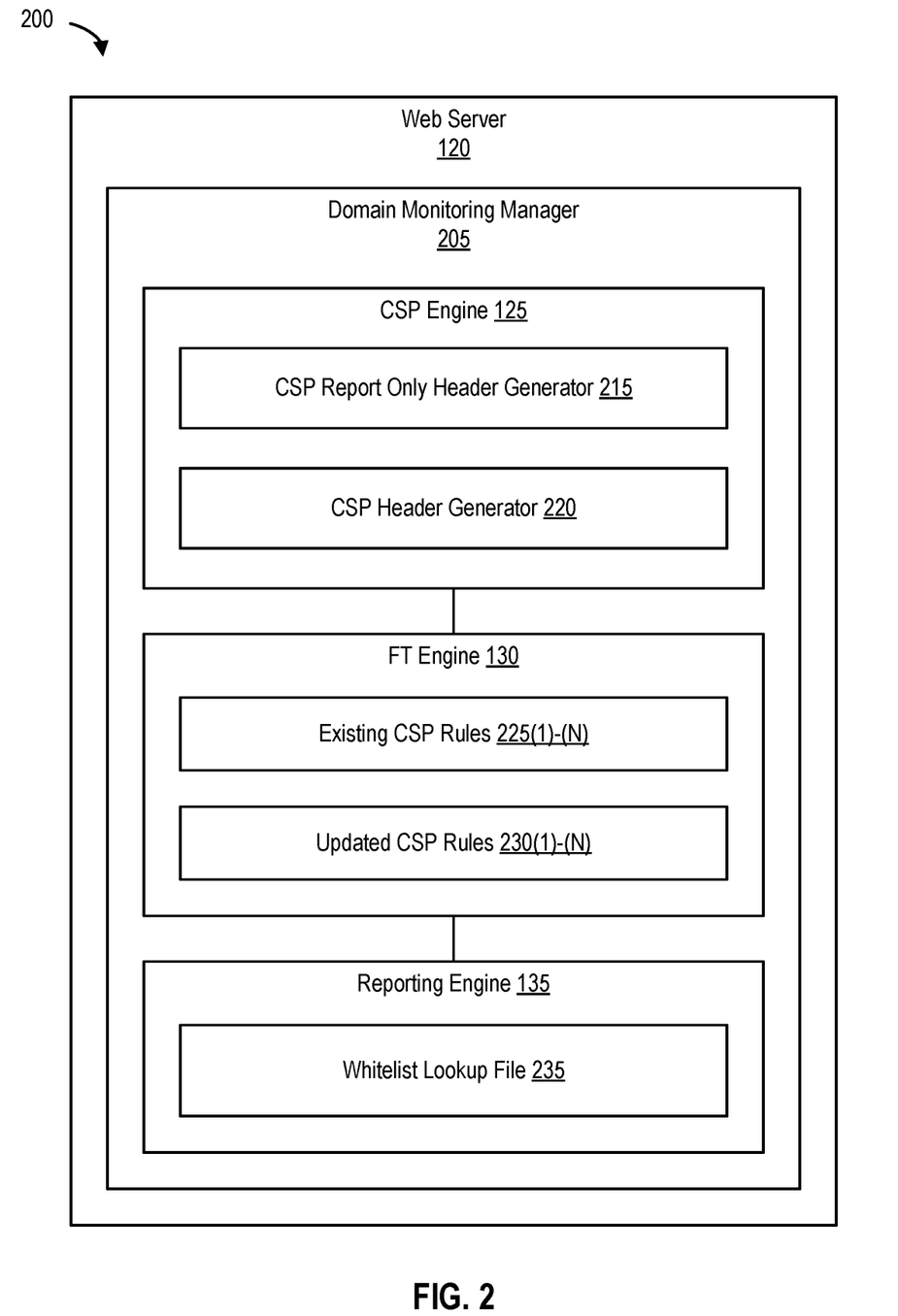
FIG. 2 is a block diagram 200 of a web server implemented with a domain monitoring manager, according to one embodiment of the present disclosure.

FIG. 2 is a block diagram 200 of a web server implemented with a domain monitoring manager 205, according to one embodiment. Domain monitoring manager 205 implements CSP engine 125, FT engine 130, and reporting engine 135. Interception engine 155 intercepts one or more third-party domains calls based on CSP HTTP header rules downloaded from web server 120 (e.g., one or more third-party calls generated by container tags (e.g., for one or more of web assets 145(1)-(N) provided by third-party domain servers 140(1)-(N)) associated with a web site provided by web server 120 and rendered on web browser 110).

Interception engine 155 intercepts such third-party calls from host properties (e.g., a commercial website provisioned by web server 120 and requested by web browser 110 of computing device 105) and feeds the intercepted third-party calls to reporting engine 135. For example, when web browser 110 loads a webpage (e.g., a web site provided by web server 120), a container tag tells web browser 110 to connect to a third-party domain server (e.g., in the form of third-party calls). The third-party domain server recognizes the container tag and executes the appropriate script(s) associated with container tag (and associated tags).

CSP engine 125 includes at least a CSP report only header generator 215 and a CSP header generator 220. CSP report only header generator 215 generates a CSP report only header that monitors third-party calls going out from web browser 110 (e.g., to one or more of third-party domain servers 140(1)-(N)) and reports such third-party calls to reporting engine 135 (e.g., to a reporting URL). CSP header generator 220 on the other hand generates a CSP header that blocks such third-party calls going out from web browser 110 (e.g., to one or more of third-party domain servers 140(1)-(N)).

As previously noted, CSP engine 125 provides CSP, which is an added layer of security that helps to detect and mitigate data injection attacks. CSP engine 125 configures web server 120 to return CSP report only headers and CSP headers (e.g., a CSP hypertext transfer protocol (HTTP)

header). Configuring CSP involves adding the CSP HTTP header to a web page and giving the CSP HTTP header values to control resources a user agent (e.g., computing device 105) is allowed to load for that web page. For example, a web page that loads and displays images could allow images from one or more third-party domain server (e.g., one or more of third-party domain servers 140(1)-(N)), but restrict a form action to a specific third-party domain server (e.g., third-party domain server 140(1)). Therefore, CSP engine 125 can at least utilize a whitelist to provide information to a client (e.g., computing device 105) regarding allowed third-party domains and blocked third-party domains, learn what directives are available and the keyword such directives take, and report policy violations to web server 120 before enforcing such policy violations.

In one embodiment, and in the first phase of the two-phase process described above, CSP engine 125 implements the CSP report only header, and in the second phase of the two-phase process described above, CSP engine 125 implements the CSP header. The CSP report only header generated by CSP report only header generator 215 and the CSP header generated by CSP header generator 220 are used by domain monitoring manager 205 to generate a blocking policy that reports to a destination URL (e.g., a reporting URL provided by reporting engine 135) if and when policy rules (e.g., CSP rules or pre-determined rule conditions) are violated. Such policy rules can be created by FT engine 130 according to a host whitelist (e.g., a whitelist lookup file) and can be used against non-whitelisted domains.

As shown in FIG. 2, FT engine 130 includes at least existing CSP rules 225(1)-(N) and updated CSP rules 230(1)-(N), and reporting engine 135 includes at least a whitelist lookup file 235. In one embodiment, web browser 110 sends a web request to a website and web server 120 (that manages and provisions the website requested) responds with a CSP header based on existing CSP rules 220(1)-(N) set in FT engine 130. Next, web browser 110 starts rendering the response from web server 120 and starts executing web assets (e.g., images, scripts, frames, and the like) to form the requested web page.

As web browser 110 tries to connect and fetch assets from third-party domains (e.g., one or more web assets 145(1)-(N) from one or more third-party domain servers 140(1)-(N)), web browser 110 (e.g., using security engine 115) checks the CSP headers returned from web server 120 (e.g., from CSP engine 125) for one or more violations. If the returned CSP headers are violated, security engine 115 of web browser 110 blocks the particular (violated) domain and transmits a violation report to reporting engine 135 (e.g., to a reporting URL).

A reporting tool deployed by reporting engine 135 at the reporting URL analyzes the violation report. The reporting tool is used to reporting engine 135 to set up whitelist lookup file 235. If the violation report does not match whitelist lookup file 235, the reporting engine 135 generates and transmits one or more security alerts (e.g., about the new/violated non-whitelisted third-party domains found on the website) to one or more security teams.

In one embodiment, a whitelist such as whitelist lookup file 235 is kept up to date (e.g., a whitelist of trustworthy vendors, and the like) by web server 120. When an updated whitelist is generated and provided by domain monitoring manager 205 to FT engine 130 as a whitelist lookup file, FT engine 130 automates the updating of the violation policy (e.g., a previous violation policy subject to existing CSP rules 225(1)-(N)) by using a feature toggle system application programming interface (FT system API), and the updated violation policy is reflected on the website in question (e.g., a website that is subject of a web request) in near real-time (e.g., in the form of updated rule conditions such as CSP rules 230(1)-(N)). Therefore, domain monitoring manager 205 provides for and facilitates the automatic updating of violation policies for third-party domain tracking and whitelisting purposes.

In another embodiment, the CSP header generated by CSP header generator 220 automatically blocks violated (third-party) calls and reports the identity of the violated third-party domains to reporting engine 135. However, it should be noted that CSP engine 125 does not remove a web beacon, a tag, or a container tag that is responsible for the violation from the website. Instead, reporting engine 135 triggers a FT system API call to FT engine 130 to automatically update the rules (e.g., to created updated CSP rules 230(1)-(N) from existing CSP rules 225(1)-(N)) in FT engine 135 (e.g., a FT system). Finally, the CSP headers (e.g., both the CSP report only header and the CSP header) are toggled using the FT system (e.g., updated by FT engine 130 to reflect updated CSP rules 230(1)-(N)).

Example of Tracking and Whitelisting Third-Party Domains

In certain embodiments, web server 120 receives a web request from computing device 105, CSP engine 125 generates a CSP header set based on rule conditions (e.g., existing rule conditions 225(1)-(N)), web server 120 transmits the CSP header set to computing device 105, reporting engine 135 receives a violation notice from computing device 105 indicating that one or more third-party domains (e.g., one or more of third-party domain servers 140(1)-(N)) used to render the web request violate at least one rule condition (e.g., at least one existing CSP rule) identified by the CSP header set, and domain monitoring engine 205 blocks the third-party domains as part of performing the web request.

In some embodiments, reporting engine 135 accesses whitelist lookup file 235, compares the violation notice with whitelist lookup file 235, and generates an alert based on the comparison (e.g., if at least one third party domain is not part of whitelist lookup file 235). In these examples, the rule conditions (e.g., the CSP rules) are set using a FT system (e.g., FT engine 130) associated with web server 120. In other embodiments, because CSP engine 125 does not remove a web beacon, a tag, or a container tag that is responsible for the site violation, whitelist lookup file 235 is updated by reporting engine 135 triggering an API call to FT engine 130. FT engine 130 then modifies the rule conditions (e.g., generates updated CSP rules 230(1)-(N)). In this example, the rule conditions are retrieved by FT engine 130 (e.g., from another server or computing device, or from web server 120).

Figure 3:
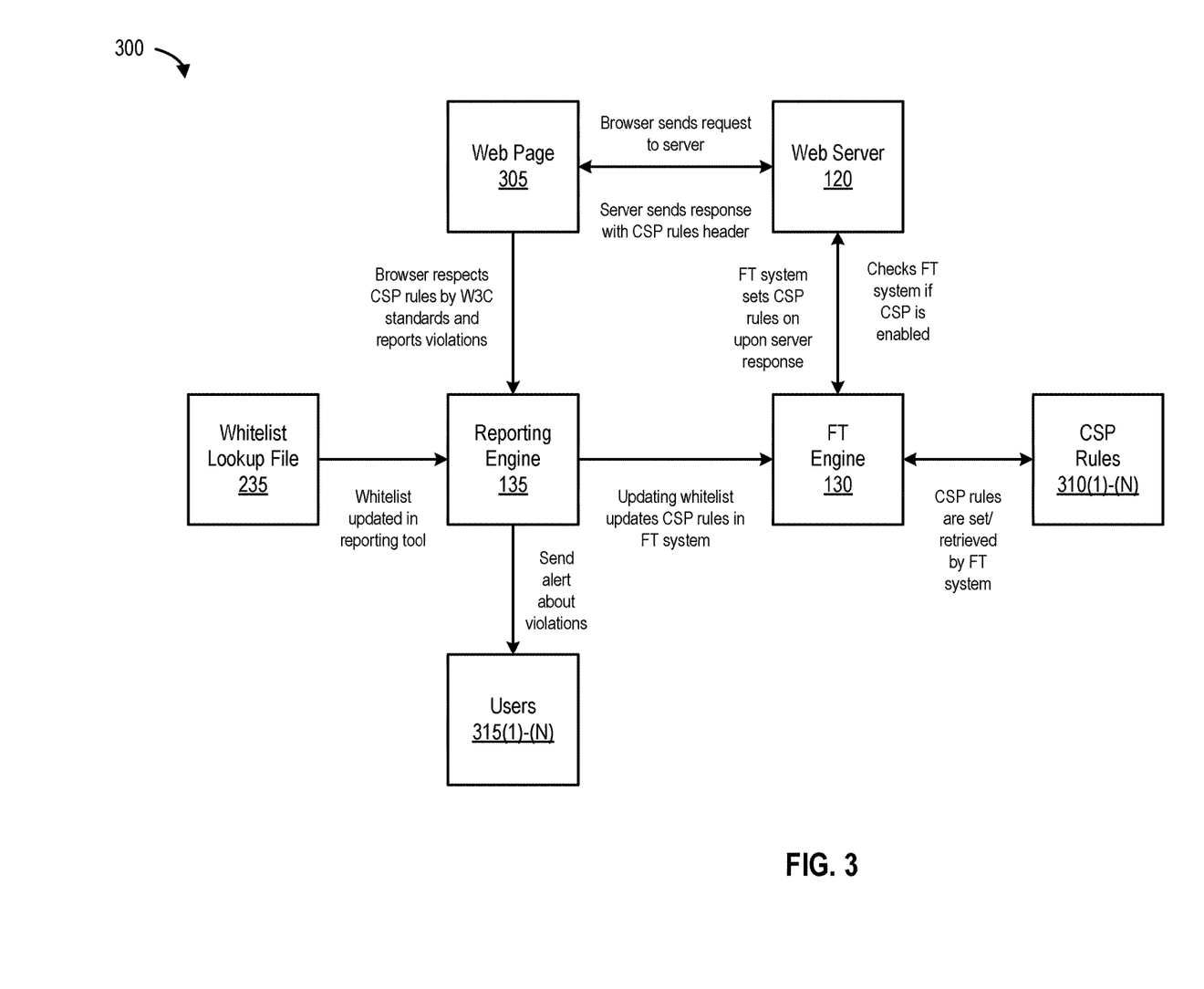
FIG. 3 is a block diagram 300 of a near real-time third-party domain monitoring computing system, according to one embodiment of the present disclosure.

FIG. 3 is a block diagram 300 of a near real-time third-party domain monitoring computing system, according to one embodiment. As shown in FIG. 3, a browser (e.g., web browser 110) sends a request (e.g., a web request for web page 305) to web server 120. Web server 120 sends a response to web page 305 with a CSP header (e.g., a CSP rules header). The browser respects the CSP rules (e.g., provided by World Wide Web Consortium (W3C) standards) and reports violations of the CSP header to reporting engine 135.

Reporting engine 135 accesses whitelist lookup file 235 and updates whitelist lookup file 235 (e.g., with the identities and information associated one or more third-party domains that violate the CSP header). Reporting engine 135 then sends alert about the violations to one or more of users 315(1)-(N) (e.g., security teams). The updating of whitelist lookup file 235 by reporting engine 135 enables reporting engine 135 to trigger the FT system API which causes FT engine 130 to automatically retrieve and update CSP rules 310(1)-(N) in FT engine 130. Web server 120 then checks if CSP is enabled, and FT engine 130 sets the (updated) CSP rules on web server 120 if CSP is enabled.

Because FT system API is triggered by reporting engine 135 by the updating of whitelist lookup file 235, the updating of the violation policy by FT engine 130 (e.g., of CSP rules or rule conditions) is automated and can be reflected on a given website in near real-time. For example, although a CSP header permits a web browser to automatically block violated third-party calls and report such violations to reporting engine 135, the CSP header does not remove a third-party web beacon, a tag, or a container tag responsible for the violation. Therefore, reporting engine 135 triggers the FT system API automatically upon the updating of whitelist lookup file 235 so as to cause FT engine 130 to automatically update CSP rules 310(1)-(N) in FT engine 130 and provide those updated CSP rules (e.g., updated CSP rules 230(1)-(N) as shown in FIG. 2) to web server 120 in an expedited (and near real-time) manner.

Therefore, the computing systems of FIGS. 1, 2, and 3 monitor, identify, and block problematic tags (e.g., malicious container tags associated with non-whitelisted third-party domains) in near real-time, and proactively track and expediently whitelist such third-party domains in an automatic fashion.

Example Processes to Track and Whitelist Third-Party Domains

Figure 4:
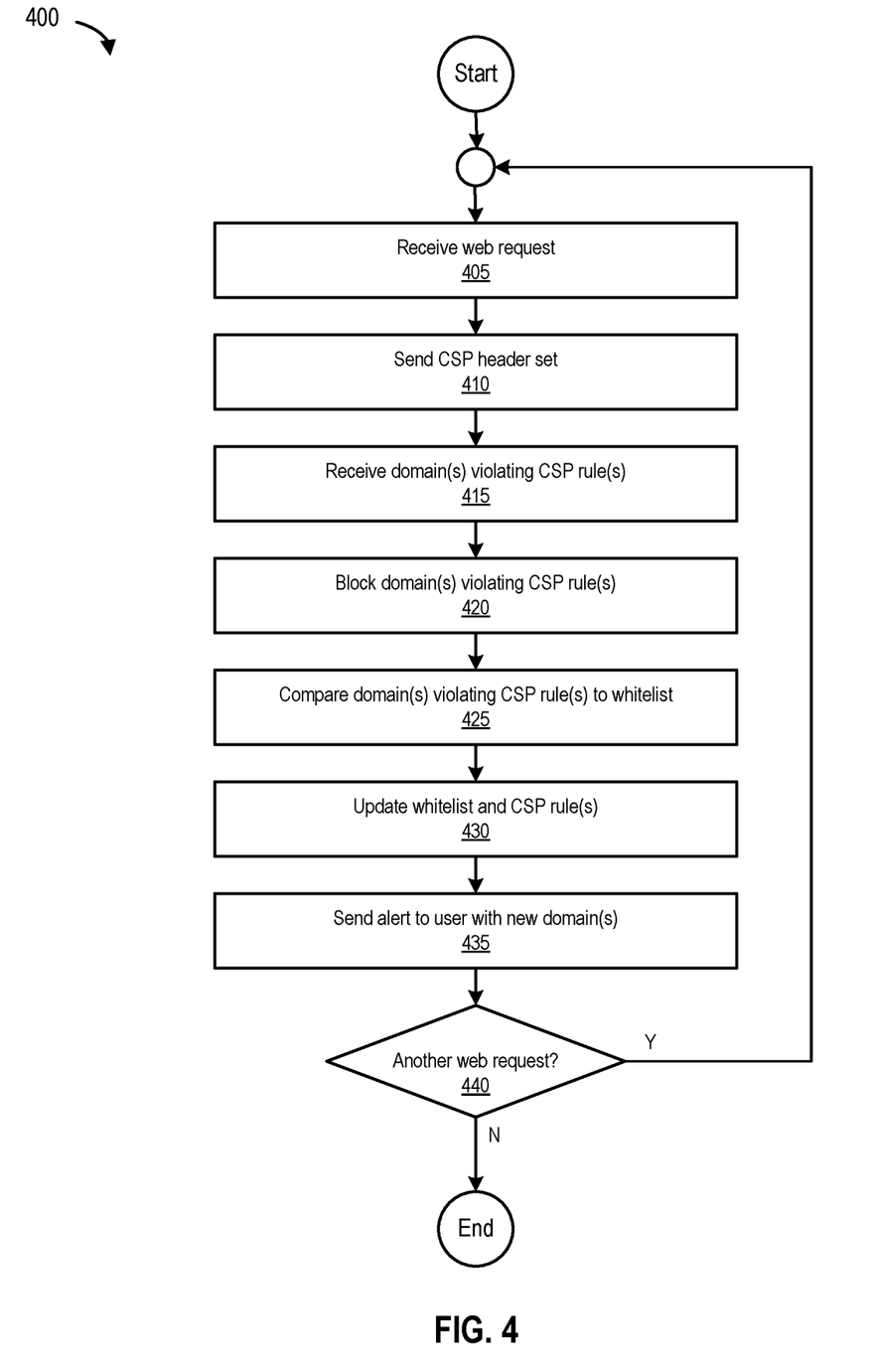
FIG. 4 is a flowchart 400 of a process for monitoring non-whitelisted third-party domains, according to one embodiment of the present disclosure.

FIG. 4 is a flowchart 400 of a process for monitoring non-whitelisted third-party domains, according to one embodiment. The process begins at 405 by receiving a web request (e.g., at webs server 120 from computing device 105). At 410, the process sends or transmits CSP header set to (e.g., to web browser 110), and at 415, receives (third-party) domain(s) violating CSP rule(s) (e.g., existing CSP rules 225(1)-(N)). At 420, the process blocks the (third-party) domain(s) violating the CSP rule(s).

At 425, the process compares domain(s) violating CSP rule(s) to a whitelist (e.g., whitelist lookup file 235), and at 430, updates the whitelist and the CSP rule(s). In one embodiment, the updating of the whitelist by a reporting tool such as reporting engine 130 causes reporting engine 130 to trigger a FT system API to FT engine 130 that causes FT engine 130 to retrieve and update the CSP rule(s) in an automatic manner and in near real-time fashion. At 435, the process ends an alert to a user with the new (violated) (third-party) domain(s). At 440, the process determines if there is another web request. If there is another web request (e.g., a subsequent web request that can immediately begin using and taking advantage of the updated CSP rules), the process loops to 405. Otherwise, the process ends.

Figure 5:
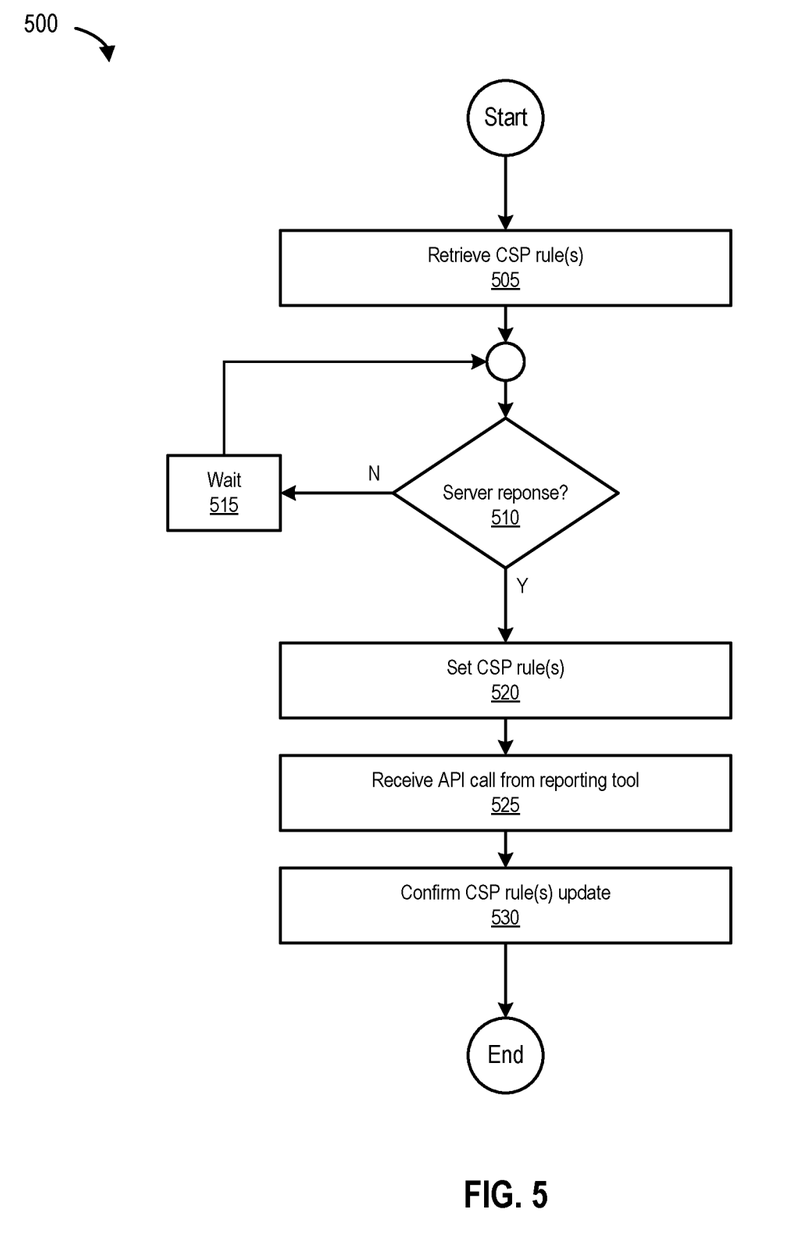
FIG. 5 is a flowchart 500 of a process for managing content security policy (CSP) rules, according to one embodiment of the present disclosure.

FIG. 5 is a flowchart 500 of a process for managing content security policy (CSP) rules, according to one embodiment. The process begins at 505 by retrieving CPS rules (e.g., CSP rules 310(1)-(N)). At 510, the process determines if there is a server response (e.g., from web server 120). If there is no server response, the process, at 515, waits. However, if there is a server response (e.g., from web server 120), the process, at 520, sets CSP rules (e.g., in FT engine 130 of domain monitoring manager 205). At 525, the process receives an API call (e.g., a FT system API) from a reporting tool (e.g., from reporting engine 135), and ends at 530 by confirming the update of the CSP rules. Therefore, by checking for updated CSP rules that are automatically updated by FT engine 130 each time whitelist lookup file 235 is updated by reporting engine 135, web server 120 can generate up-to-date and security-enabled CSP headers for each subsequent web request.

Figure 6:
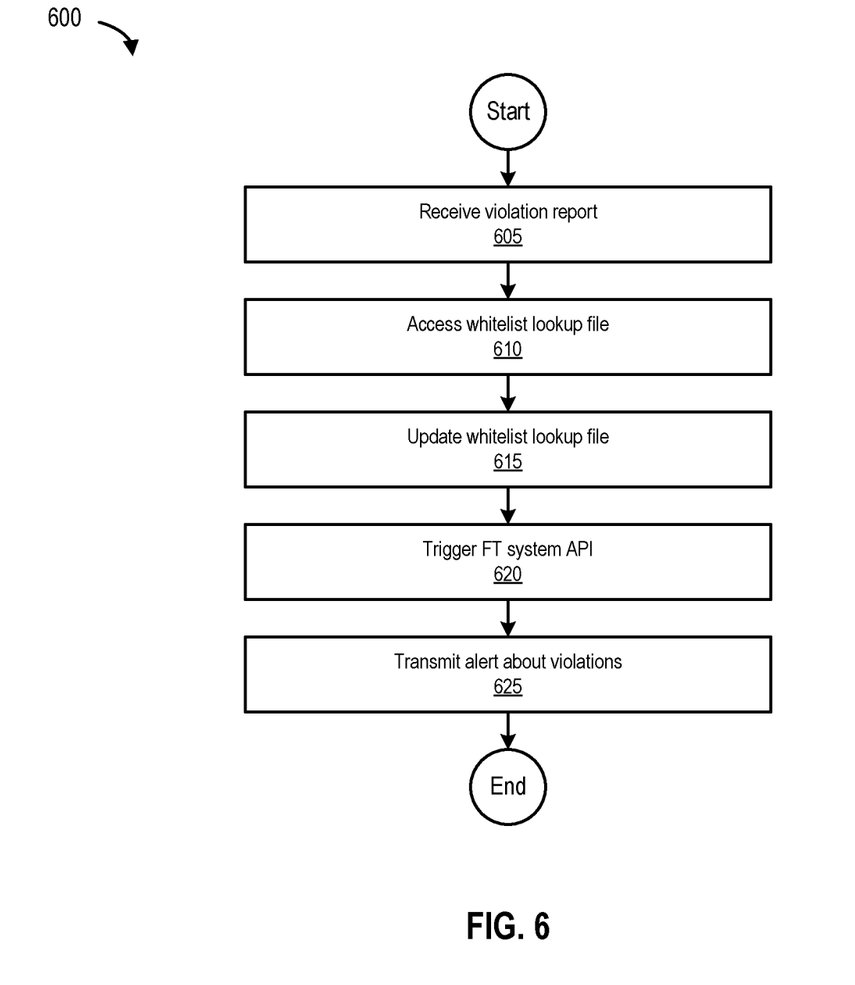
FIG. 6 is a flowchart 600 of a process for updating a whitelist, according to one embodiment of the present disclosure.

FIG. 6 is a flowchart 600 of a process for updating a whitelist, according to one embodiment. The process begins at 605 by receiving a violation report (e.g., violation(s) of a CSP header received at a destination/reporting URL from a web browser). At 610, the process accesses a whitelist lookup file, and at 615, updates the whitelist lookup file (e.g., with the identities and associated information regarding the third-party domains that violate the CSP header). At 620, the process triggers a FT system API (e.g., an API that causes FT engine 130 to automatically retrieve and update CSP rules that can be accessed by web server 120 to service a subsequent web request with an up-to-date security-enabled CSP header), and ends at 625 by transmitting an alert about the violation(s) (e.g., to one or more security teams that include users one or more of users 315(1)-(N)).

Therefore, the computing processes of FIGS. 4, 5, and 6 monitor, identify, and block problematic tags (e.g., malicious container tags associated with non-whitelisted third-party domains) in near real-time, and proactively track and expediently whitelist such third-party domains automatically.

Example Computing Environment

Figure 7:
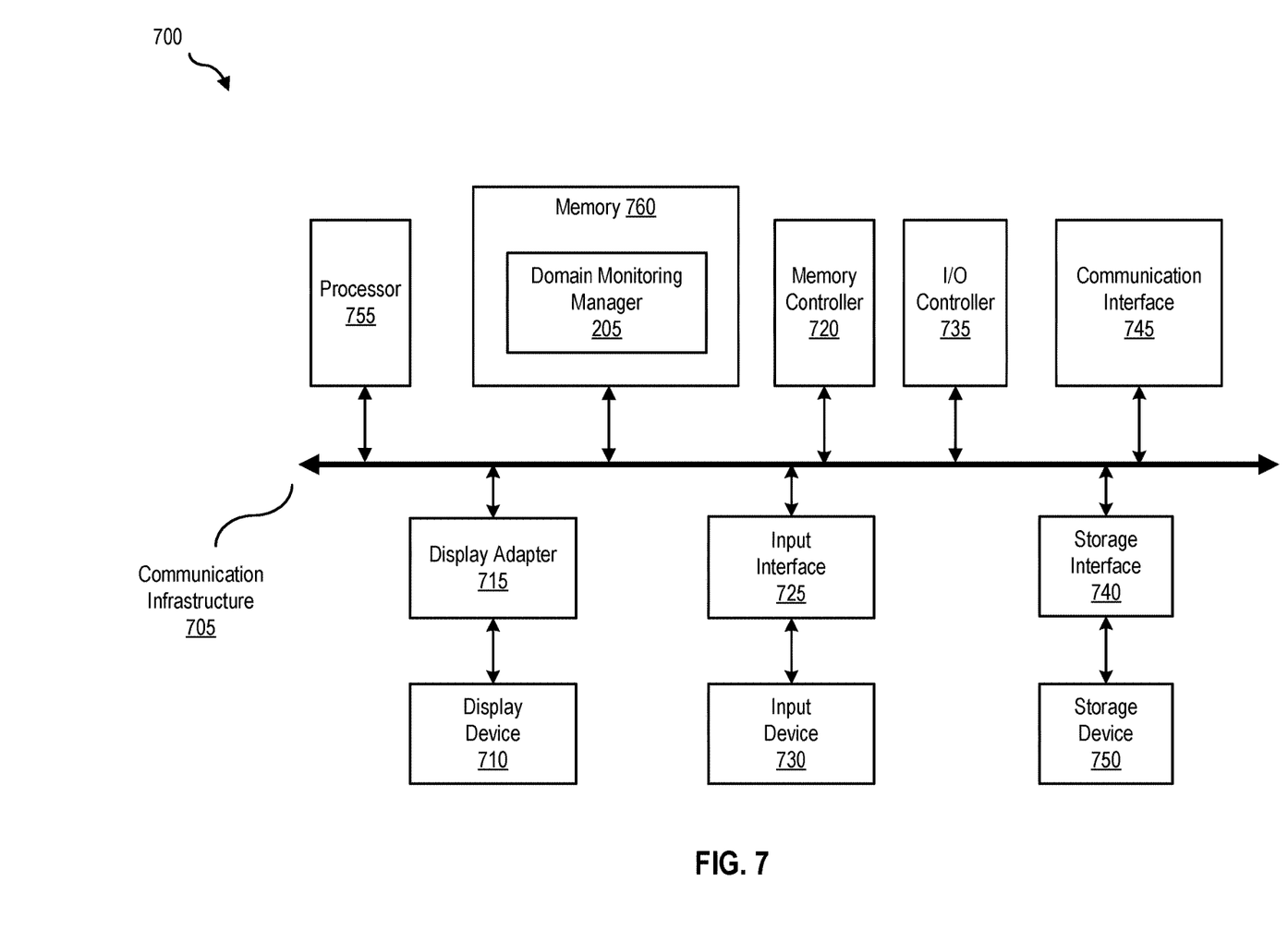
FIG. 7 is a block diagram 700 of a computing system, according to one embodiment of the present disclosure.

FIG. 7 is a block diagram 700 of a computing system, illustrating how domain monitoring manager 205 can be implemented in software, according to one embodiment. Computing system 700 can include web server 120 and broadly represents any single or multi-processor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 700 may include at least one processor 755 and a memory 760. By executing the software that executes domain monitoring manager 205, computing system 700 becomes a special purpose computing device that is configured to track and whitelist third-party domains.

Processor 755 generally represents any type or form of processing unit capable of processing data or interpreting and executing instructions. In certain embodiments, processor 755 may receive instructions from a software application or module. These instructions may cause processor 755 to perform the functions of one or more of the embodiments described and/or illustrated herein. For example, processor 755 may perform and/or be a means for performing all or some of the operations described herein. Processor 755 may also perform and/or be a means for performing any other operations, methods, or processes described and/or illustrated herein. Memory 760 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 700 may include both a volatile memory unit and a non-volatile storage device. In one example, program instructions implementing domain monitoring manager 205 may be loaded into memory 760.

In certain embodiments, computing system 700 may also include one or more components or elements in addition to processor 755 and/or memory 760. For example, as illustrated in FIG. 7, computing system 700 may include a memory controller 720, an Input/Output (I/O) controller 735, and a communication interface 745, each of which may be interconnected via a communication infrastructure 705. Communication infrastructure 705 generally represents any type or form of infrastructure capable of facilitating communication between one or more components of a computing device. Examples of communication infrastructure 705 include, without limitation, a communication bus (such as an Industry Standard Architecture (ISA), Peripheral Component Interconnect (PCI), PCI express (PCIe), or similar bus) and a network.

Memory controller 720 generally represents any type/form of device capable of handling memory or data or controlling communication between one or more components of computing system 700. In certain embodiments memory controller 720 may control communication between processor 755, memory 760, and I/O controller 735 via communication infrastructure 705. In certain embodiments, memory controller 720 may perform and/or be a means for performing, either alone or in combination with other elements, one or more of the operations or features described and/or illustrated herein.

I/O controller 735 generally represents any type or form of module capable of coordinating and/or controlling the input and output functions of an appliance and/or a computing device. For example, in certain embodiments I/O controller 735 may control or facilitate transfer of data between one or more elements of computing system 700, such as processor 755, memory 760, communication interface 745, display adapter 715, input interface 725, and storage interface 740.

Communication interface 745 broadly represents any type or form of communication device or adapter capable of facilitating communication between computing system 700 and one or more other devices. Communication interface 745 may facilitate communication between computing system 700 and a private or public network including additional computing systems. Examples of communication interface 745 include, without limitation, a wired network interface (such as a network interface card), a wireless network interface (such as a wireless network interface card), a modem, and any other suitable interface. Communication interface 745 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 745 may also represent a host adapter configured to facilitate communication between computing system 700 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 745 may also allow computing system 700 to engage in distributed or remote computing (e.g., by receiving/sending instructions to/from a remote device for execution).

As illustrated in FIG. 7, computing system 700 may also include at least one display device 710 coupled to communication infrastructure 705 via a display adapter 715. Display device 710 generally represents any type or form of device capable of visually displaying information forwarded by display adapter 715. Similarly, display adapter 715 generally represents any type or form of device configured to forward graphics, text, and other data from communication infrastructure 705 (or from a frame buffer, as known in the art) for display on display device 710. Computing system 700 may also include at least one input device 730 coupled to communication infrastructure 705 via an input interface 725. Input device 730 generally represents any type or form of input device capable of providing input, either computer or human generated, to computing system 700. Examples of input device 730 include a keyboard, a pointing device, a speech recognition device, or any other input device.

Computing system 700 may also include storage device 750 coupled to communication infrastructure 705 via a storage interface 740. Storage device 750 generally represents any type or form of storage devices or mediums capable of storing data and/or other computer-readable instructions. For example, storage device 750 may include a magnetic disk drive (e.g., a so-called hard drive), a floppy disk drive, a magnetic tape drive, an optical disk drive, a flash drive, or the like. Storage interface 740 generally represents any type or form of interface or device for transferring and/or transmitting data between storage device 750, and other components of computing system 700. Storage device 750 may be configured to read from and/or write to a removable storage unit configured to store computer software, data, or other computer-readable information. Examples of suitable removable storage units include a floppy disk, a magnetic tape, an optical disk, a flash memory device, or the like. Storage device 750 may also include other similar structures or devices for allowing computer software, data, or other computer-readable instructions to be loaded into computing system 700. For example, storage device 750 may be configured to read and write software, data, or other computer-readable information. Storage device 750 may also be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7. Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The computer-readable medium containing the computer program may be loaded into computing system 700. All or a portion of the computer program stored on the computer-readable medium may then be stored in memory 760 and/or various portions of storage device 750. When executed by processor 755, a computer program loaded into computing system 700 may cause processor 755 to perform and/or be a means for performing the functions of one or more of the embodiments described/illustrated herein. Additionally or alternatively, one or more of the embodiments described and/or illustrated herein may be implemented in firmware and/or hardware. For example, computing system 700 may be configured as an application specific integrated circuit (ASIC) adapted to implement one or more of the embodiments disclosed herein.

Example Networking Environment

Figure 8:
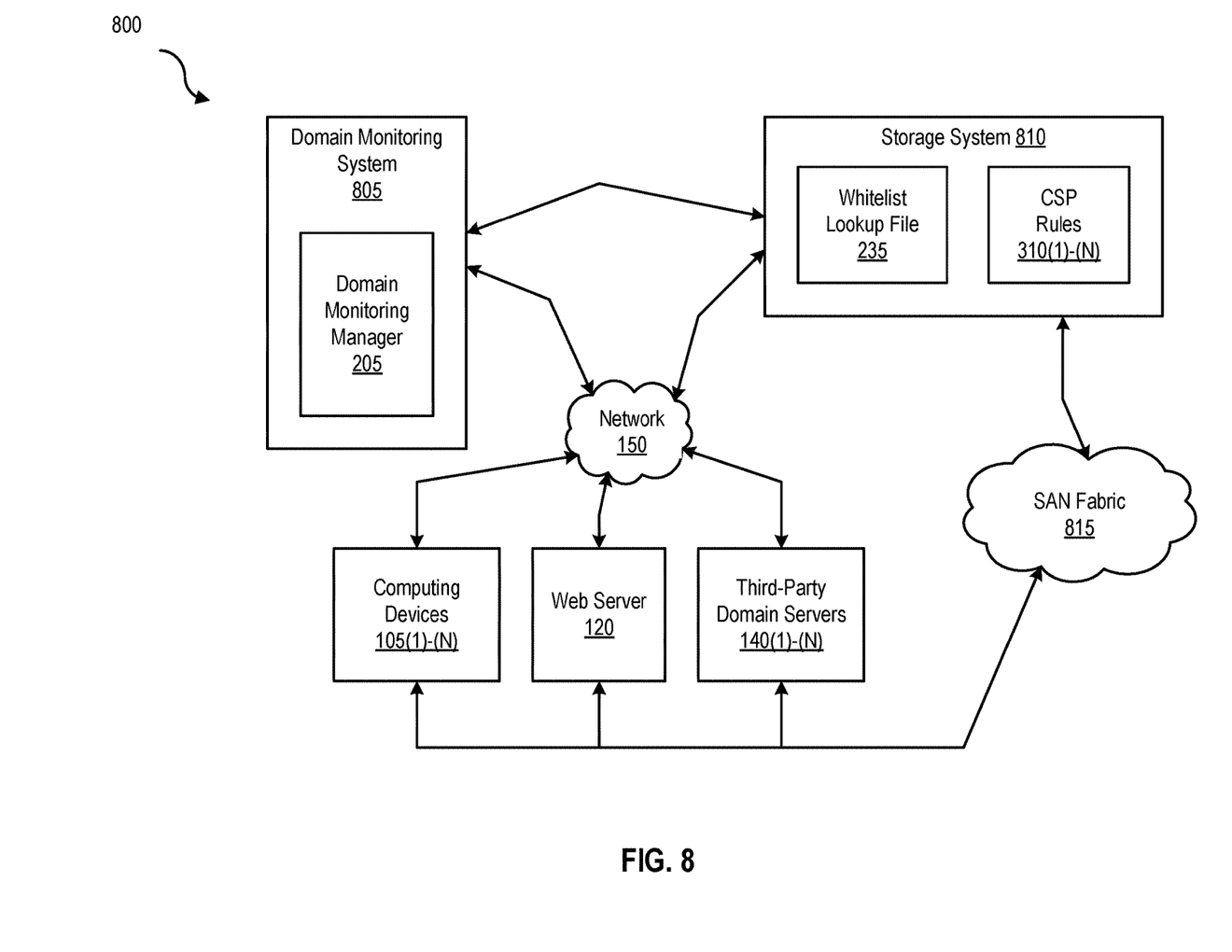
FIG. 8 is a block diagram 800 of a networked system, according to one embodiment of the present disclosure.

FIG. 8 is a block diagram of a networked system, illustrating how various computing devices can communicate via a network, according to one embodiment. In certain embodiments, network-attached storage (NAS) devices may be configured to communicate with computing devices 105(1)-(N), web server 120, and/or third-party domain servers 140(1)-(N) using Network File System (NFS), Server Message Block (SMB), or Common Internet File System (CIFS). Network 150 generally represents any type or form of computer network or architecture capable of facilitating communication between computing devices 105(1)-(N), web server 120, and/or third-party domain servers 140(1)-(N).

In certain embodiments, a communication interface, such as communication interface 745 in FIG. 7, may be used to provide connectivity between computing devices 105(1)-(N), web server 120, and/or third-party domain servers 140(1)-(N), and network 150. The embodiments described and/or illustrated herein are not limited to the Internet or any particular network-based environment.

In some embodiments, network 150 can be a Storage Area Network (SAN). In other embodiments, domain monitoring manager 205 may be part of web server 120, or may be separate. If separate, domain monitoring system 805, computing devices 105(1)-(N), web server 120, and/or third-party domain servers 140(1)-(N) may be communicatively coupled via network 150.

In one embodiment, all or a portion of one or more of the disclosed embodiments may be encoded as a computer program and loaded onto and executed by computing devices 105(1)-(N), web server 120, third-party domain servers 140(1)-(N), and/or domain monitoring system 805, or any combination thereof. All or a portion of one or more of the embodiments disclosed herein may also be encoded as a computer program, stored on computing devices 105(1)-(N), web server 120, and/or domain monitoring system 805, and distributed over network 150.

In some examples, all or a portion of computing devices 105(1)-(N), web server 120, third-party domain servers 140(1)-(N), and/or domain monitoring system 805 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, domain monitoring manager 205 may transform the behavior of web server 120 and/or domain monitoring system 805 in order to cause web server 120 and/or domain monitoring system 805 to track and whitelist third-party domains.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
   receiving, by a web server, a web request from a browser executing on a computing device, the web request requesting a web page hosted by the web server;
   generating, by the web server, a Content Security Policy (CSP) header set based on a plurality of rule conditions that are set using a feature toggle system associated with the web server;
   transmitting, by the web server, the CSP header set to the browser executing on the computing device;
   receiving, by the web server, a violation notice from the browser executing on the computing device indicating that one or more third party domains of a plurality of third party domains used to render the web request violate at least one rule condition of the plurality of rule conditions identified by the CSP header set;
   determining, by the web server, that at least one third party domain of the one or more third party domains is not included in a whitelist lookup file;
   blocking the at least one third party domain based at least in part in determining that the at least one third party domain is not included in the whitelist lookup file;
   triggering an application programming interface (API) call to the feature toggle system based at least in part on determining that the at least one third party domain is not part of the whitelist lookup file, the API call to the feature toggle system updating the whitelist lookup file by modifying the plurality of rule conditions in the feature toggle system to include the at least one third party domain; and
   performing the web request.

2. The computer-implemented method of claim 1, further comprising:
   accessing the whitelist lookup file;
   performing a comparison of the violation notice with the whitelist lookup file; and
   generating an alert notice based on the comparison based at least in part on determining that the at least one third party domain is not included in the whitelist lookup file.

3. The computer-implemented method of claim 1, wherein: the feature toggle system manages the plurality of rule conditions; and the plurality of rule conditions apply to at least one of: a tag, a tag container, and a domain associated with the web request.

4. The computer-implemented method of claim 1, wherein:
   the violation notice is received from the browser via a universal resource locator (URL) provided by the web server.

5. The computer-implemented method of claim 1, wherein
   the plurality of rule conditions are retrieved by the feature toggle system.

6. The computer-implemented method of claim 1, further comprising:

intercepting one or more third party calls generated for the one or more third party domains used to render the web request.

7. The computer-implemented method of claim 1, wherein the CSP header set comprises:
one or more CSP report only headers; and
one or more CSP headers.

8. A non-transitory computer readable storage medium comprising program instructions executable by one or more processors of a web server to:
receive a web request from a browser executing on a computing device, the web request requesting a web page hosted by the web server;
generate a Content Security Policy (CSP) header set based on a plurality of rule conditions that are set using a feature toggle system associated with the web server;
transmit the CSP header set from the web server to the browser executing on the computing device;
receive a violation notice from the browser executing on the computing device indicating that one or more third party domains of a plurality of third party domains used to render the web request violate at least one rule condition of the plurality of rule conditions identified by the CSP header set;
determine that at least one third party domain of the one or more third party domains is not included in a whitelist lookup file;
block the at least one third party domain based at least in part in determining that the at least one third party domain is not included in the whitelist lookup file;
trigger an application programming interface (API) call to the feature toggle system based at least in part on determining that the at least one third party domain is not part of the whitelist lookup file, the API call to the feature toggle system updating the whitelist lookup file by modifying the plurality of rule conditions in the feature toggle system to include the at least one third party domain; and
perform the web request.

9. The non-transitory computer readable storage medium of claim 8, further comprising:
access the whitelist lookup file;
perform a comparison of the violation notice with the whitelist lookup file; and
generate an alert notice based on the comparison and based on determining that the at least one third party domain is not included in the whitelist lookup file.

10. The non-transitory computer readable storage medium of claim 8, wherein
the feature toggle system manages the plurality of rule conditions; and
the plurality of rule conditions apply to: a tag, a tag container, and a domain associated with the web request.

11. The non-transitory computer readable storage medium of claim 8, wherein:
the violation notice is received from the browser via a universal resource locator (URL) provided by the web server.

12. The non-transitory computer readable storage medium of claim 8, wherein
the plurality of rule conditions are retrieved by the feature toggle system.

13. The non-transitory computer readable storage medium of claim 8, further comprising:

intercept one or more third party calls generated for the one or more third party domains used to render the web request.

14. The non-transitory computer readable storage medium of claim 8, wherein the CSP header set comprises:
one or more CSP report only headers; and
one or more CSP headers.

15. A web server comprising:
one or more processors; and
a memory coupled to the one or more processors, wherein the memory stores program instructions executable by the one or more processors to:
receive a web request from a browser executing on a computing device;
generate a Content Security Policy (CSP) header set based on a plurality of rule conditions that are set using a feature toggle system associated with the web server;
transmit the CSP header set to the browser executing on the computing device;
receive a violation notice from the browser executing on the computing device indicating that one or more third party domains of a plurality of third party domains used to render the web request violate at least one rule condition of the plurality of rule conditions identified by the CSP header set;
determine that at least one third party domain of the one or more third party domains is not included in a whitelist lookup file;
block the at least one third party domain based at least in part in determining that the at least one third party domain is not included in the whitelist lookup file;
trigger an application programming interface (API) call to the feature toggle system based at least in part on determining that the at least one third party domain is not part of the whitelist lookup file, the API call to the feature toggle system updating the whitelist lookup file by modifying the plurality of rule conditions in the feature toggle system to include the at least one third party domain; and
perform the web request.

16. The web server of claim 15, the program instructions further executable by the one or more processors to:
access the whitelist lookup file;
perform a comparison of the violation notice with the whitelist lookup file; and
generate an alert notice based on the comparison and based on determining that the at least one third party domain is not included in the whitelist lookup file.

17. The web server of claim 15, wherein
the feature toggle system manages the plurality of rule conditions; and
the plurality of rule conditions apply to: a tag, a tag container, and a domain associated with the web request.

18. The web server of claim 15, wherein:
the violation notice is received from the browser via a universal resource locator (URL) provided by the web server.

19. The web server of claim 15, wherein
the plurality of rule conditions are retrieved by the feature toggle system, and
the CSP header set comprises:
one or more CSP report only headers; and
one or more CSP headers.

20. The web server of claim 15, the program instructions further executable by the one or more processors to:

intercept one or more third party calls generated for the one or more third party domains used to render the web request.

* * * * *